Oct. 15, 1935.  A. D. TRACY  2,017,265
ANIMAL FEEDING AND WATERING DEVICE
Filed April 18, 1934
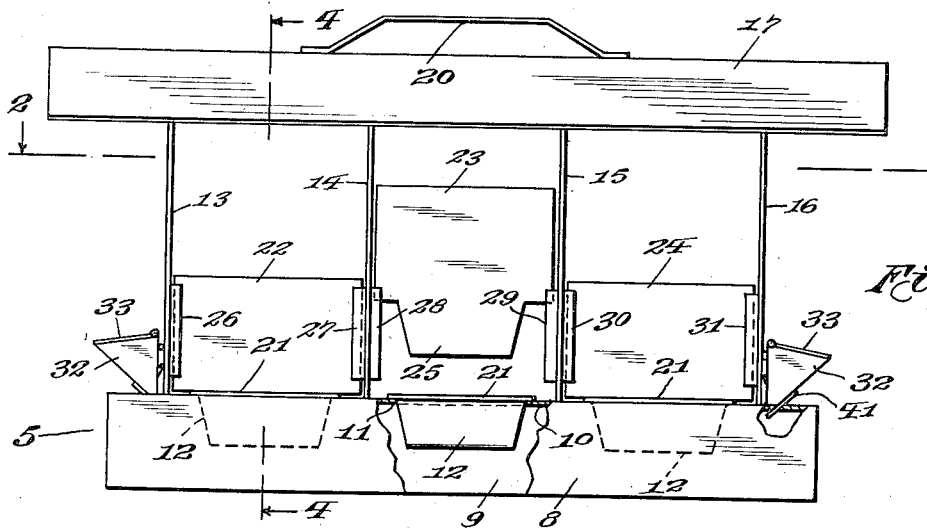
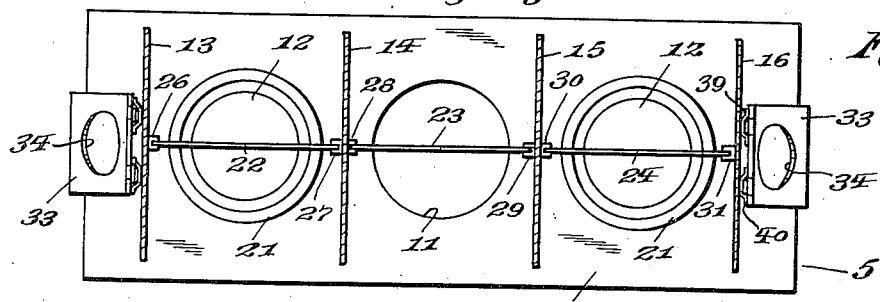
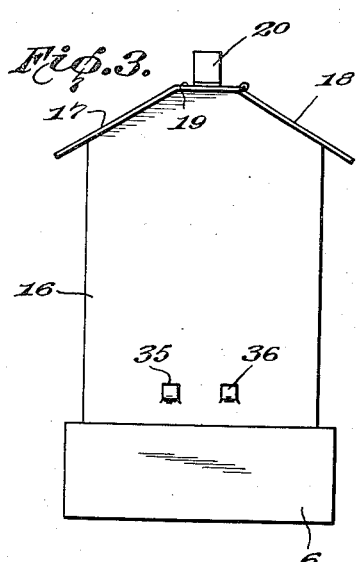
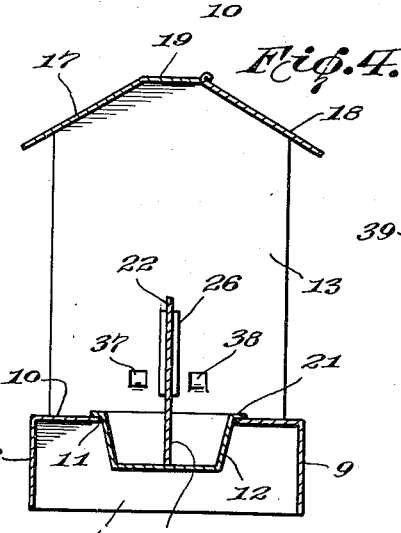
Inventor:
Arthur D. Tracy.
By Hartwell Balcom.
Attorney Patented Oct. 15, 1935

2,017,265

UNITED STATES PATENT OFFICE 2,017,265

ANIMAL FEEDING AND WATERING DEVICE

Arthur D. Tracy, Lunenburg, Mass.

Application April 18, 1934, Serial No. 721,192

2 Claims. (Cl. 119—61)

The subject-matter of the present invention relates generally to animal husbandry, and the improvements are directed to a novel and unique device adapted for use in connection with feeding and watering foxes and other small animals.

Primarily, the object of the invention is to provide a device of the above-mentioned character which is simple, yet sturdy, in construction, and which may be transported from place to place, if desired, to meet existing conditions.

Another object is to provide a device wherein animals may partake of their food without interfering with one another, thus securing individual feeding without resort to a large number of separate feed pans, or the like.

Still another object of the invention resides in the provision of novel watering cups, so constructed as to prevent the animal from wasting or carelessly exhausting the liquid furnished.

A still further object is to provide a feeding and watering device that may be easily cleaned, and maintained in a sanitary condition at all times.

With the above objects in view and any others which may suggest themselves from the specification and claims to follow, a better understanding of the invention may be gained by reference to the accompanying drawing, in which:

Figure 1 is a side elevation of the device, partly in section, and showing one of the slidable partitions in an elevated position.

Fig. 2 is a horizontal, longitudinal sectional view, taken on the line 2—2 of Fig. 1.

Fig. 3 is an end elevation of the device.

Fig. 4 is a transverse vertical section, taken on the line 4—4 of Fig. 1.

Fig. 5 is a rear elevation, slightly enlarged, of one of the watering cups.

Fig. 6 is a front elevation thereof.

Fig. 7 is a view of one of the slidable partitions.

Referring now more in detail to the accompanying drawing, wherein like characters of reference denote similar parts throughout the several views, let 5 indicate the base or supporting member of the device, said member comprising end walls 6 and 7, front and rear walls 8 and 9, and a top portion 10, the latter being provided with a plurality of openings 11 for the reception of the feed pans 12, as will presently appear. Said supporting member 5 carries a series of vertical walls 13, 14, 15 and 16, which are arranged in spaced parallel relation, walls 13 and 16 forming respectively the end walls of the device, whilst walls 14 and 15 are positioned inwardly of said end walls to provide compartments above each feed pan, and front and rear of said compartments being open, as shown in Fig. 2, to permit the entrance of the head of the animal seeking food.

The upper edges of said vertically disposed walls 13, 14, 15 and 16, support a canopy 17, having a hinged section 18, the central portion of said canopy being provided with a flat portion 19 carrying a handle 20 whereby the entire device may be transported from place to place to facilitate the feeding of the animals.

It will be understood that the aforesaid parts that are arranged in fixed relation to one another may be arranged in the positions shown and secured by any suitable fastening method, such as spot-welding, soldering, or the like.

In the present embodiment of the invention three compartments or stalls are provided, though, of course, this number may be increased or decreased as desired. Said compartments will each be provided with a single feed pan, designated by the numeral 12 in Fig. 1, and it will be observed that each pan is provided with a circumferential flange 21 which overlies the peripheral edge of said openings 11 so that each pan has its top portion substantially flush with the top surface of said portion 10. In view of this arrangement the pans may be easily and quickly placed in said openings and removed therefrom as the food supply becomes exhausted.

While the above arrangement of compartments or stalls serves somewhat to prevent crowding of the animals at the feeding periods, it is proposed to provide means that will positively obviate undue interference, and to this end it will be noted that I have supplied slidable partitions 22, 23 and 24, one for each stall, each partition having a tongue-like projection 25 which extends to the bottom of each of the feed pans 12 to serve as an auxiliary partition therein, (see Fig. 4). In view of this arrangement, each stall is divided into two sections and each feed pan is similarly divided, and hence, the animals feeding by way of the front and rear portions of the individual stalls may do so without interference or the like.

As shown in Figs. 1 and 2, walls 13 and 14 are provided with guides 26 and 27, respectively, whilst walls 14 and 15 of the central compartment support guides 28 and 29, respectively, the other compartment between walls 15 and 16, being supplied with guides 30 and 31, respectively, said guides serving as runways for the slidable partitions, whereby each of said partitions may be elevated, (see Fig. 1) to permit the removal of a feed pan when desired.

Upon inspection of Figs. 1 and 2 it will be observed that each of the end walls 13 and 16 is provided with a water cup 32, the latter having a hinged top 33 provided with an opening 34 whereby the animal may gain access to the liquid for drinking purposes, without danger of splashing out the same. Wall 16 is provided with a pair of juxtaposed struck-out tongues 35 and 36, whilst wall 13 is also provided with a pair of similar tongues 37 and 38, each pair of tongues being inserted through loops 39 and 40, (see Fig. 5), of the water cups. In order that the cups may be securely fastened in position, suitable latch means 41, (see Fig. 6) will be provided, said latch means being arranged to project through the base 10, as shown in Fig. 1. Said latch means 41 may be swung out of the openings in the base and the loops 39 and 40 withdrawn from their respective clips when the cups are to be removed. Water may be supplied to the cups by any well-known means.

I claim:

1. A device of the character described comprising a base having an opening, a removable feed pan fitting into said opening and having its top portion arranged substantially flush with the top surface of said base, spaced walls supported by said base, and a slidable partition borne by said walls to present juxtaposed stalls therebetween, said partition having a projection extending to the bottom of said feed pan to secure the latter within said opening and to divide the same into separate compartments, one for each stall.

2. A feeding device comprising a support having a top, sides and ends, said top having an opening therein, a removable feed pan adapted to fit in said opening and having a circumferential flange to maintain said pan with its top portion substantially flush with said top of said support, spaced walls supported by said top, a canopy carried by said walls, guides carried by said walls and a partition slidably carried in said guides and arranged to divide the area between said walls into stalls, said partition having a tongue-like projection extendable to the bottom of said feed pan to position said pan within said opening and to divide the same into separate compartments, one for each stall.

ARTHUR D. TRACY.